(12) United States Patent
Tang et al.

(10) Patent No.: US 8,199,130 B2
(45) Date of Patent: Jun. 12, 2012

(54) FIXING STRUCTURE, PEN CLIPPING SET, AND ELECTRONIC DEVICE

(75) Inventors: Tsung-Lung Tang, Taipei Hsien (TW); Wei-Jung Luo, Taipei Hsien (TW); Yi-Chieh Luo, Taipei Hsien (TW); Cheng-Min Hsiu, Taipei Hsien (TW)

(73) Assignee: Wistron Corporation, Taipei Hsien (TW)

( * ) Notice: Subject to any disclaimer, the term of this patent is extended or adjusted under 35 U.S.C. 154(b) by 711 days.

(21) Appl. No.: 12/222,881

(22) Filed: Aug. 19, 2008

(65) Prior Publication Data

US 2009/0153524 A1    Jun. 18, 2009

(30) Foreign Application Priority Data

Dec. 14, 2007   (TW) .............................. 96221411 U

(51) Int. Cl.
*G06F 3/033*    (2006.01)
*G06F 3/041*    (2006.01)
*G06F 3/043*    (2006.01)
*G06F 3/042*    (2006.01)

(52) U.S. Cl. ......... 345/179; 345/176; 345/177; 345/178

(58) Field of Classification Search ........... 345/176–179
See application file for complete search history.

(56) References Cited

U.S. PATENT DOCUMENTS

| 5,365,461 | A  | * | 11/1994 | Stein et al. ..................... 700/298 |
| 5,777,647 | A  | * | 7/1998  | Pawlowski et al. ............. 347/86 |
| 6,788,532 | B2 | * | 9/2004  | Yang et al. ............... 361/679.33 |
| 2004/0119703 | A1 | * | 6/2004 | Yang et al. ..................... 345/179 |
| 2006/0109617 | A1 | * | 5/2006 | Chen et al. .................... 361/683 |

* cited by examiner

*Primary Examiner* — Alexander Eisen
*Assistant Examiner* — Amit Chatly
(74) *Attorney, Agent, or Firm* — Bacon & Thomas, PLLC

(57) ABSTRACT

The fixing structure of the invention capable of connecting to a pen with a slot comprises a main body, a slide piece, and a push module. The main body comprises a slide slot and an opening. The slide piece can slide into the slide slot. The slide piece comprises a first slide unit and a second slide unit. The first slide unit comprises a first pressing element. The push module comprises a second pressing element, and the push module has a loose state and a tight state. When the push module is in the loose state, at least a portion of the first pressing element is in the opening; when the push module is in the tight state, the second pressing element connects to the second slide unit, and the first pressing element connects to the slot of the pen.

8 Claims, 5 Drawing Sheets

FIXING STRUCTURE, PEN CLIPPING SET, AND ELECTRONIC DEVICE

BACKGROUND OF THE INVENTION

1. Field of the Invention

The present invention relates to a fixing device, a pen clipping set, and an electronic device. It is especially a fixing device, a pen clipping set, and an electronic device capable of fixing a pen.

2. Description of the Related Art

In a prior art, a touch pen connects to an electronic device by a containing slot and a fixing element. Because the touch pen has a structure which matches the fixing element, the fixing element can fix the touch pen when the touch pen slides into the containing slot. However, when the touch pen is taken out, the user has to pull on the touch pen directly. The pull force must be large enough to make the fixing element depart from its fixing position, and the touch pen can be removed consequently. It not only causes inconvenience but also influences the whole appearance because part of the touch pen protrudes from the casing.

In a prior art, there is also a fixing structure allowing insertion and removal of a touch pen. However, the touch pen has a particular structure. It comprises a clip, and the fixing element is clipped by the clip. The clip comprises the matching structure for fixing the touch pen. Because the touch pen is only used for choosing icons or writing on the screen of the electronic device, a touch pen with a complicated structure will do nothing but increase the manufacturing and fabrication cost.

Therefore, it is desirable to provide a fixing structure, a pen clipping set capable of fixing a pen, and an electric device with the fixing structure to mitigate and/or obviate the aforementioned problems.

SUMMARY OF THE INVENTION

A main objective of the present invention is to provide a fixing structure capable of fixing a pen.

Another objective of the present invention is to provide a pen clipping set that facilitates the insertion and removal of a pen.

Still another objective of the present invention is to provide an electric device with the fixing structure.

In order to achieve the aforementioned objectives, an electric device of the invention comprises a case and a fixing structure, and a pen clipping set is formed by the fixing structure and a pen with a slot wherein the fixing structure comprises a main body, a slide piece, and a push module. The main body comprises a slide slot and an opening. The slide piece can slide into the slide slot. The slide piece comprises a first slide unit and a second slide unit. The first slide unit comprises a first pressing element, and the push module which has a loose state and a tight state comprises a second pressing element. When the push module is in the loose state, at least a portion of the first pressing element is in the opening; when the push module is in the tight state, the second pressing element connects to the second slide unit, and the first pressing element connects to the slot.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
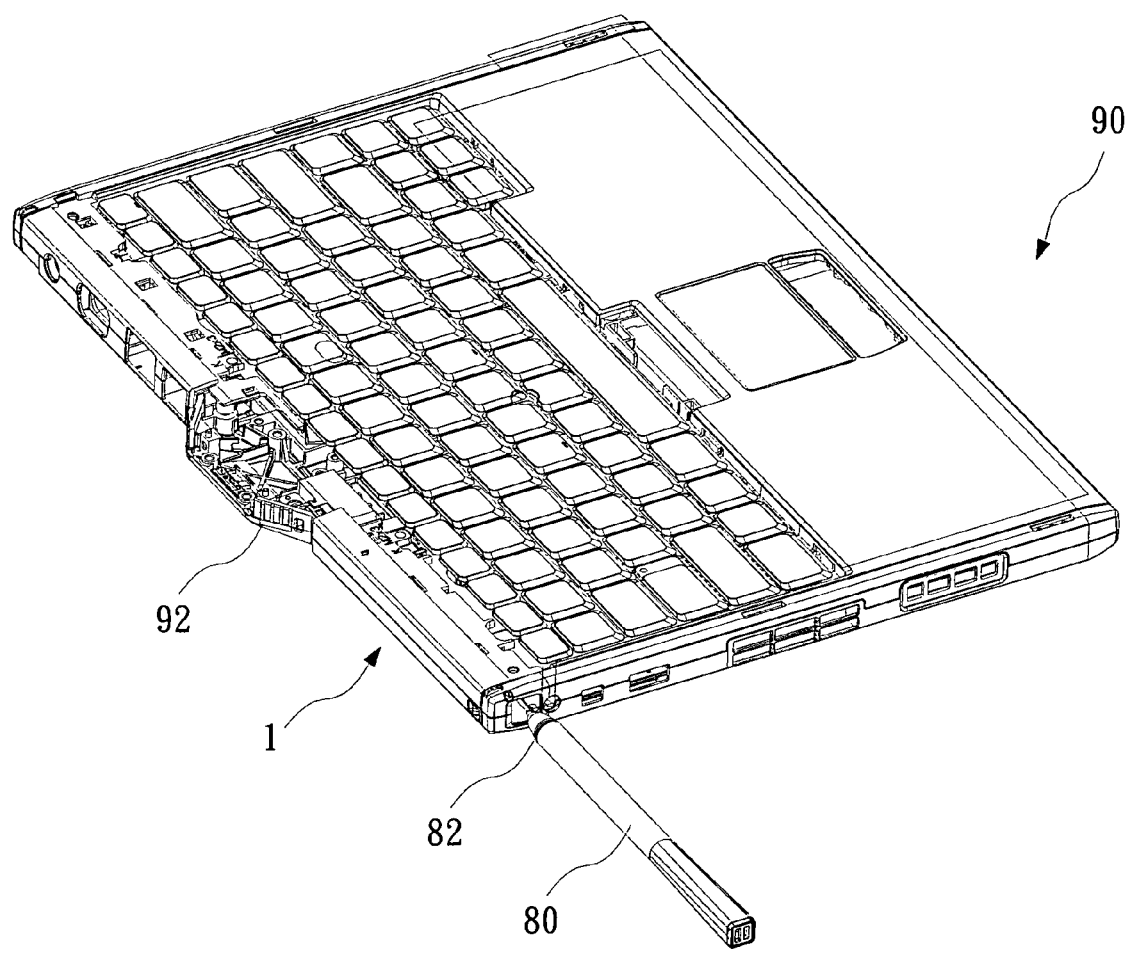
FIG. 1 is a schematic drawing of an electric device of the invention.
Figure 2:
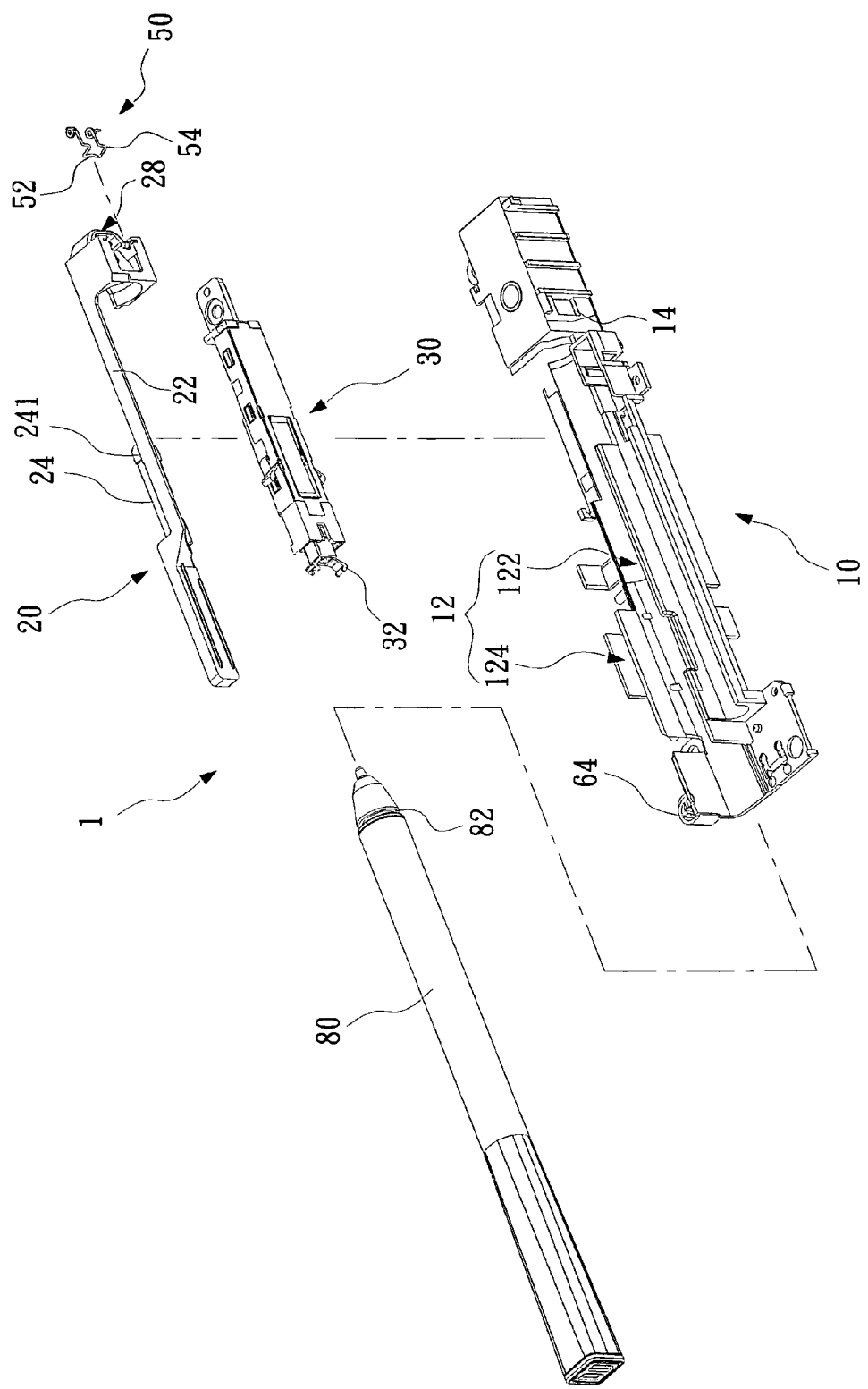
FIG. 2 is an exploded drawing of a fixing structure of the invention.
Figure 3:
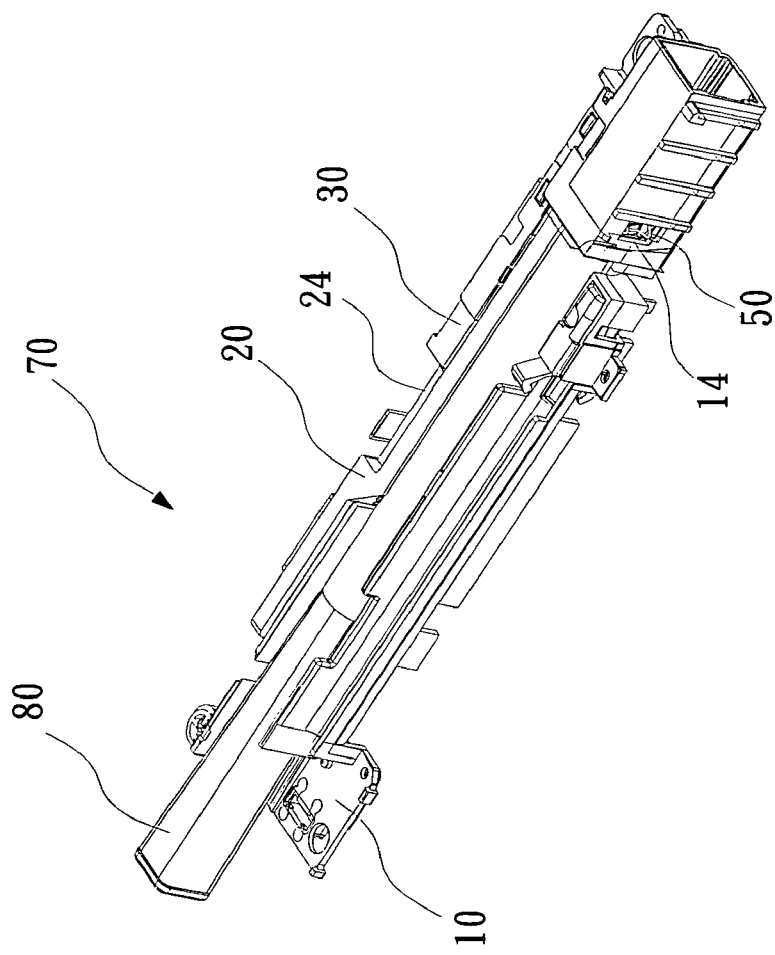
FIG. 3 is a perspective drawing of a fixing structure of the invention.

Please refer to FIG. 1 to FIG. 3 together. FIG. 1 is a schematic drawing of an embodiment of an electric device of the invention. FIG. 2 is an exploded drawing of an embodiment of a fixing structure of the invention. FIG. 3 is a perspective drawing of an embodiment of a fixing structure of the invention.

Please refer to FIG. 1 first. The electric device 90 comprises a case 92 and a fixing structure 1, wherein the fixing structure is connected to the case 92. The fixing structure 1 can be connected to a pen 80 with a slot 82. When the pen 80 is contained in the fixing structure 1, it forms a pen clipping set 70 (as shown in FIG. 3). In this embodiment, the electric device 1 is a notebook, and the pen 80 is a touch pen. It should be noted that the object which the fixing structure 1 can be connected is not limited to a pen. It can also be another long and thin object.

Please refer to FIG. 2 and FIG. 3 together. The fixing structure 1 comprises a main body 10, a slide piece 20, a push module 30, and an indicating device wherein the main body 10 is connected to the case 92, and the main body 10 comprises a slide slot 12 and an opening 14. In this embodiment, the slide slot 12 comprises a main slide slot 122 and an auxiliary slide slot 124.

The slide piece 20 comprises a first slide unit 22 and a second slide unit 24 wherein the first slide unit 22 comprises a first pressing element 50, and the slide piece 20 can slide into the slide slot 12. In this embodiment, the first slide unit 22 is in the main slide slot 122, and the second slide unit 24 is deposited in the auxiliary slide slot 124.

Figure 4:
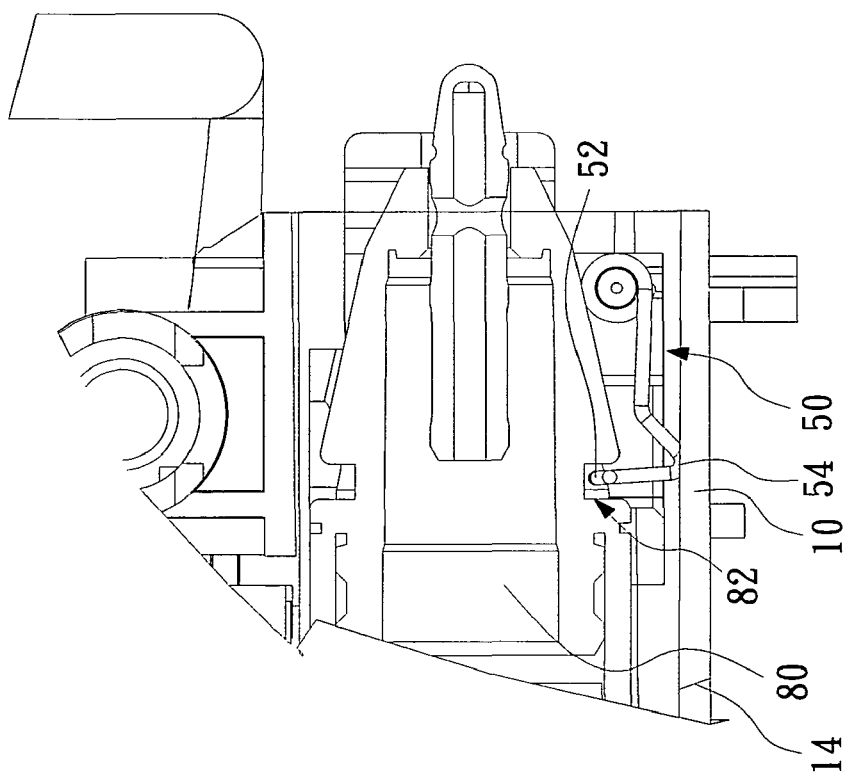
FIG. 4 shows a pressing element of the fixing structure of the invention.

The first pressing element 50, which is deposited in the first slide unit 22, is an element that can directly clip into the slot 82 of the pen 80. In this embodiment, the first pressing element 50 is a torsion spring in a special shape (please refer to FIG. 2, FIG. 3 and FIG. 4; FIG. 4 is a schematic drawing of an embodiment of a pressing element in the fixing structure). It comprises a slot against portion 52 roughly in an arc shape and a main body against portion 54 which can press the inner wall of the main body 10. When the main body against portion 54 presses the inner wall of the main body 10, the slot against portion 52 clips the slot 82 of the pen 80. It should be noted that the structure and the number of the first pressing element 50 are not limited to the aforementioned embodiment.

The push module 30 comprises a second pressing element 32. In this embodiment, the second pressing element 32 is in a double claw shape. The characteristic of the push module 30 is that it has two use states. The second pressing element 32 presses toward the push module 30 continuously, so the second pressing element 32 in a double claw shape can just clip the protruding end portion 241 of the second slide unit 24. Once this has happened, it is in the tight state, and the second pressing element 32 is positioned in the predetermined position. Once the push module 30 is already in the tight state, the second pressing element 32 presses toward the push module 30, and then it returns to the loose state again. In the loose state, the push module 30 does not have the clipping and positioning function.

It should be noted that the second pressing element 32 and the second slide unit 24 are not limited to the aforementioned structure. As long as the second pressing element and the second slide unit are matched with each other, it should be within the claim of the invention.

Figure 5:
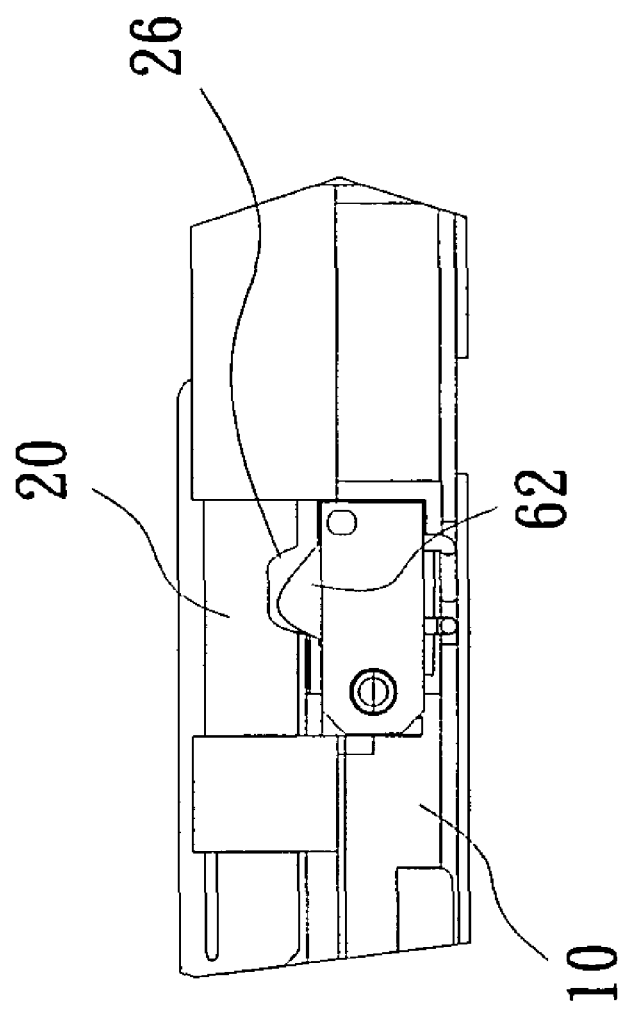
FIG. 5 shows a switch unit of the fixing structure of the invention.

Please refer to FIG. 2 and FIG. 5. FIG. 5 is a schematic drawing of a switch unit in the fixing structure of the invention. The indicating device comprises a switch unit 62 and a light unit 64. In this embodiment, the switch unit 62 is a button in roughly triangular shape. In order to match the shape of the switch unit 62, the slide piece 20 comprises an inclined plane 26 (as shown in FIG. 5). During the process from the loose state moving to the tight state, the pen 80 and the slide piece 20 move together, and the inclined plane 26 of the slide piece 20 touches the switch unit 62 to activate the light unit 64. The light unit 64 is a luminous element. For example, the light unit 64 is an LED.

In this embodiment, the purpose of the indicating device is to warn a user that the pen 80 is not contained in the fixing structure 1. Therefore, when the inclined plane 26 does not touch the switch unit 62, the pen 80 is not contained in the fixing structure 1. Therefore, the light unit 64 is illuminated continuously until the inclined plane 26 touches the switch unit 62, at which point it is deactivated, indicating that the pen 80 is already contained in the slot 12 of the fixing structure 1. It should be noted that in addition to the switch unit being directly activated by touch, it can be a sensor detecting the position of the slide piece 20.

Please refer to FIG. 1 to FIG. 5 together for further illustration of the usage and the operating principle of the fixing structure of the invention.

(1) The Loose State:

When the push module 30 is in the loose state, the pen 80 is not contained in the slide slot 12 (as shown in FIG. 1). At least part of the first pressing element 50 is deposited in the opening 14, the first pressing element 50 does not produce elasticity, and the second pressing element 32 does not clip the second slide unit 24.

(2) The Processing State:

When the pen 80 is contained in the slide slot 12 by the user and is not clipped, the slide piece 20 does not slide. The pen 80 slides along the slide slot 12 continuously until the pen point of the pen 80 touches against the portion 28 of the slide piece 20. At that point, the pen 80 and the slide piece 20 start to move together the pressure of the pen against portion 28.

Then the pen 80 slides along the slide slot 12, and the pen 80 and the slide piece 20 can move together. At this moment, the user needs to apply external force, and the first pressing element 50 departs from the position of the opening 14 (as shown in FIG. 3). The main body against the portion of the first pressing element 50 slides and presses the inner wall of the main body 10. The first pressing element 50 is pressed to produce the force to clip the slot 82 of the pen 80. At this moment, the end portion 241 of the second slide unit 24 inserts into the push module 30. The pressing element 32 of the push module 30 starts to clip the end portion 241. Furthermore, in the processing state, the switch unit 62 of the indicating device touches the indicated plane 26 of the slide piece 20 (as shown in FIG. 5).

(3) The Tight State:

When the pen 80 slides along the slide slit 12 until the push module is in the tight state, the second pressing element 32 of the push module 30 clips the second slide unit 24 of the slide piece 20, and the slot against portion 52 of the first pressing element 50 clips the clip 82 of the pen 80, so the pen 80 is fixed in the fixing structure 1 solidly. At this moment, the user can remove the applied force, and the whole fixing structure 1 is in the positioning state.

(4) Back to the Loose State:

When the user presses the tail portion of the pen 80, which is already fixed in the fixing structure 1, then it returns to the loose state due to the operating principle of the push module 30. The user can remove the pen 80 from the fixing structure 1 easily.

Although the present invention has been explained in relation to its preferred embodiment, it is to be understood that many other possible modifications and variations can be made without departing from the spirit and scope of the invention as hereinafter claimed.

What is claimed is:

1. A fixing structure capable of connecting to a pen, the pen comprising a slot, the fixing structure comprising:
   a main body, the main body comprising a slide slot and an opening;
   a slide piece, the slide piece capable of sliding into the slide slot, the slide piece comprising a first slide unit and a second unit, the first slide unit comprising a first pressing element;
   a push module, the push module comprising a second pressing element, and the push module having a loose state and a tight state:
   wherein when the push module is in the loose state, at least part of the first pressing element is deposited in the opening;
   wherein when the push module is in the tight state, the second pressing element clips the second slide unit, and the first pressing element slips into the slot of the pen;
   wherein the first pressing element is a torsion spring in a special shape and comprises a slot against portion roughly in an arc shape and a main body against portion, such that when it is in the tight state, the main body against portion presses the main body, causing the slot against portion to clip into the slot of the pen;
   wherein the slide slot comprises a main slide slot and an auxiliary slide slot, the first slide unit being deposited in the main slide slot, and the second slide unit being deposited in the auxiliary slide slot, the second pressing element being in a double claw shape, the second slide element comprising a protruding end portion, and the second pressing element clipping the end portion; and
   wherein when the second pressing element releases the end portion of the second slide unit, the pen and the slide piece return to the loose state together due to the push of the push module.

2. The fixing structure as claimed in claim 1, wherein the fixing structure further comprises an indicating device, the indicating device comprising a switch unit and a light unit.

3. The fixing structure as claimed in claim 2, wherein the slide piece comprises an inclined plane, such that during the process of the loose state moving to the tight state, the inclined plane touches the switch unit to activate the light unit.

4. The fixing structure as claimed in claim 2, wherein the switch unit is a button or a sensor.

5. A pen clipping set comprising:
   a pen, the pen comprising a slot;
   a main body, the main body comprising a slide slot and an opening;

a slide piece, the slide piece capable of sliding in the slide slot, the slide piece comprising a first slide unit and a second unit, and the first slide unit comprising a first pressing element;

a push module, the push module comprising a second pressing element, and the push module having a loose state and a tight state:

wherein when the push module is in the loose state, at least part of the first pressing element is deposited in the opening;

wherein when the push module is in the tight state, the second pressing element clips the second slide unit, and the first pressing element slips into the slot of the pen wherein the first pressing element is a torsion spring in a special shape and comprises a slot against portion roughly in an arc shape and a main body against portion, such that when it is in the tight state, the main body against portion presses the main body, causing the slot against portion to clip into the slot of the pen;

wherein the slide slot comprises a main slide slot and an auxiliary slide slot, the first slide unit being deposited in the main slide slot, and the second slide unit being deposited in the auxiliary slide slot, the second pressing element being in a double claw shape, the second slide element comprising a protruding end portion, and the second pressing element clipping the end portion; and wherein when the second pressing element releases the end portion of the second slide unit, the pen and the slide piece return to the loose state together due to the push of the push module.

6. The pen clipping set as claimed in claim 5, wherein the fixing structure further comprises an indicating device, the indicating device comprising a switch unit and a light unit.

7. The pen clipping set as claimed in claim 6, wherein the slide piece comprises an inclined plane, such that during the process of the loose state moving to the tight state, inclined plane touches the switch unit to activate the light unit.

8. An electric device capable of connecting to a pen, the pen comprising a slot, the electric device comprising:

a case; and a fixing structure connected to the case, the fixing structure comprising:

a main body, the main body comprising a slide slot and an opening;

a slide piece, the slide piece capable of sliding into the slide slot, the slide piece comprising a first slide unit and a second unit, the first slide unit comprising a first pressing element;

a push module, the push module comprising a second pressing element, and the push module has a loose state and a tight state:

wherein when the push module is in the loose state, at least part of the first pressing element is deposited in the opening;

wherein when the push module is in the tight state, the second pressing element clips the second slide unit, and the first pressing element slips into the slot of the pen wherein the first pressing element is a torsion spring in a special shape and comprises a slot against portion roughly in an arc shape and a main body against portion, such that when it is in the tight state, the main body against portion presses the main body, causing the slot against portion to clip into the slot of the pens;

wherein the slide slot comprises a main slide slot and an auxiliary slide slot, the first slide unit being deposited in the main slide slot, and the second slide unit being deposited in the auxiliary slide slot, the second pressing element being in a double claw shape, the end portion of the second slide element comprising a protruding end portion, and the second pressing element clipping the end portion; and wherein when the second pressing element releases the end portion of the second slide unit, the pen and the slide piece return to the loose state together due to the push of the push module.

* * * * *